US012160779B2

(12) United States Patent
Chari et al.

(10) Patent No.: US 12,160,779 B2
(45) Date of Patent: Dec. 3, 2024

(54) DETECTING AND SWITCHING WIRELESS NETWORKS

(71) Applicant: Roku, Inc., San Jose, CA (US)

(72) Inventors: Amalavoyal Narasimha Chari, Los Altos, CA (US); Erwan Suteau, Sunnyvale, CA (US); David Arnstein, Fremont, CA (US); Sudipto Nandi, San Jose, CA (US)

(73) Assignee: Roku, Inc., San Jose, CA (US)

( * ) Notice: Subject to any disclaimer, the term of this patent is extended or adjusted under 35 U.S.C. 154(b) by 303 days.

(21) Appl. No.: 17/321,075

(22) Filed: May 14, 2021

(65) Prior Publication Data

US 2022/0303856 A1    Sep. 22, 2022

Related U.S. Application Data

(60) Provisional application No. 63/163,549, filed on Mar. 19, 2021.

(51) Int. Cl.
*H04W 24/00* (2009.01)
*H04L 65/80* (2022.01)
*H04W 36/00* (2009.01)

(52) U.S. Cl.
CPC ......... *H04W 36/0038* (2013.01); *H04L 65/80* (2013.01)

(58) Field of Classification Search
CPC ............. H04W 36/30; H04W 36/0038; H04W 36/0083; H04W 36/14; H04W 36/165; H04W 48/18; H04W 12/06; H04L 65/80; H04L 65/1069; H04L 65/612

USPC ................. 455/436, 437; 370/338
See application file for complete search history.

(56) References Cited

U.S. PATENT DOCUMENTS

| 9,749,700 B1 | 8/2017 | Hollinger |
| 2011/0255513 A1* | 10/2011 | Karaoguz ......... H04M 3/42136 370/331 |
| 2015/0055566 A1 | 2/2015 | Lin et al. |

(Continued)

OTHER PUBLICATIONS

Extended European Search Report directed to related European Application No. 22163033.8, mailed on Aug. 1, 2022; 8 pages.

*Primary Examiner* — Marcos Batista
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for a media device operating on a first network that can detect and switch media service to a second network to maintain access of a desired service quality. The media device can cause a presentation of the recommended second network, and receive a selection (e.g., user input) of the second network before the switch. The recommendation can be user-initiated or occur while accessing service without user initiation. The recommendation of the second network can be based on: a signal quality of the second network and/or the capabilities of the device providing the second network; a correlation of characteristics that indicate that stored credentials of a first network can be reused in another network; a security level of the first network; and/or platform capabilities of the media device.

20 Claims, 8 Drawing Sheets

(56) References Cited

U.S. PATENT DOCUMENTS

| | | | |
|---|---|---|---|
| 2015/0350173 A1* | 12/2015 | Tanase | H04L 63/08 |
| | | | 726/7 |
| 2017/0353245 A1* | 12/2017 | Vardarajan | H04B 10/2939 |
| 2019/0066687 A1 | 2/2019 | Wood et al. | |
| 2019/0373464 A1 | 12/2019 | Chari et al. | |
| 2021/0211877 A1* | 7/2021 | Lagnado | H04W 84/12 |
| 2021/0337530 A1* | 10/2021 | Raghavan | H04B 7/0628 |
| 2022/0130114 A1* | 4/2022 | Handa | G06T 19/006 |

\* cited by examiner

DETECTING AND SWITCHING WIRELESS NETWORKS

CROSS-REFERENCE TO RELATED APPLICATIONS

This application claims the benefit of U.S. Provisional Patent Application 63/163,549, filed Mar. 19, 2021 and entitled "Detecting and Switching Wireless Networks," which is incorporated in its entirety herein.

BACKGROUND

Field

This disclosure is generally directed to improving the quality of media service over a network, and in particular, over multiple wireless networks.

Background

Media content, such as a movie, can be provided via a media service. Users streaming content from the media service may do so by establishing a connection to a local wireless network.

Often, these wireless networks are established using consumer grade devices and are maintained by casual home users. Because of this, a user accessing streaming content may be doing so in a way that is not ideal for the bandwidth requirements needed by the media service. Accordingly, it is desirable to provide ways to simplify access to the media service in a way that takes advantage of functionality present in the network that the user may not have configured.

SUMMARY

Provided herein are system, apparatus, article of manufacture, method and/or computer program product embodiments, and/or combinations and sub-combinations thereof, for a media device operating on a first network that can detect and switch media service to a second network to maintain a desired service quality or improve a service quality. The media device can cause a presentation of the recommended second network, and receive a selection (e.g., user input) of the second network before the switch. The recommendation can be user-initiated or occur while providing service without user initiation. The recommendation of the second network can be based on: a signal quality of the second network and/or the capabilities of the communication device providing the second network; a correlation of any characteristics that indicate that credentials of a wireless network can be reused in another wireless network (e.g., a pattern matching based on a Service Set Identifier (SSID) of the first network, and a stored access credential of the first network); a security level of the first network; and/or platform capabilities of the media device providing the media service.

Some embodiments include a method for a media device that includes accessing a media service via a first wireless network, and based on a trigger corresponding to the media service, determining availability of a second wireless network. The method includes comparing a first attribute of the first wireless network with a second attribute of the second wireless network, and based on the comparison, determining that the second wireless network is a recommended network. The method further includes utilizing a first access credential of the first wireless network as a second access credential of the recommended network, and subsequent to the utilizing, establishing a connection with the recommended network. The establishing the connection with the recommended network can include accessing the first access credential of the first wireless network, and transmitting the first access credential of the first wireless network to a communication device providing the recommended network.

The comparing of the first and second attributes can include performing a pattern match corresponding to a subset of letters or numbers of a first Service Set Identifier (SSID) of the first wireless network, and a second SSID of the second wireless network. In some embodiments, the comparing includes receiving data corresponding to one or more communication devices providing wireless networks including the recommended network, comparing the data with platform capabilities of the media device, and selecting the recommended network based on the comparison of the data. The platform capabilities comprise: a protocol type, a security level, a maximum bandwidth, a number of antennas, a global positioning system (GPS) location, or a distance between the media device and a communication device providing the recommended network.

In some examples, the method includes determining that the utilization of the first access credential as the second access credential failed, receiving input for the second access credential of the recommended network, and transmitting the second access credential to a communication device providing the recommended network.

The method can also include transmitting a signal for presenting the recommended network and choices, receiving input to switch to the recommended network, and switching from the first wireless network to the recommended network. In some embodiments the method includes determining that a record for the second access credential of the recommended network does not exist, generating the record for the second access credential, and storing the record of the second access credential.

BRIEF DESCRIPTION OF THE FIGURES

The accompanying drawings are incorporated herein and form a part of the specification.

DETAILED DESCRIPTION

Provided herein are system, apparatus, device, method and/or computer program product embodiments, and/or combinations and sub-combinations thereof, for a media device operating on a first network that can detect and switch media service to a second network to maintain a desired service quality or improve a service quality. Some embodiments include providing a user interface (UI) that gives the user an opportunity to improve media service by taking advantage of existing networks without needing to add new equipment (e.g., router, extender device) and/or without reconfiguring a wireless network.

In some embodiments, the media device can cause a presentation of the recommended second network, and receive a selection (e.g., user input) of the second network before the switch. The recommendation can be user-initiated or occur while accessing media service without user initiation. The recommendation of the second network can be based on: a signal quality of the second network; noise, interference or channel utilization characteristics of the second network; preferences for a channel or frequency band, as specified by the user or by a network operator, or programmed within the device; and/or the capabilities of the communication device providing the second network; correlation of any characteristics that indicate that credentials of the first network can be reused in the second network (e.g., a pattern matching based on a Service Set Identifier (SSID) of the first network), and a stored password of the first network; a security level of the first network; and/or platform capabilities of the media device.

Figure 1A:
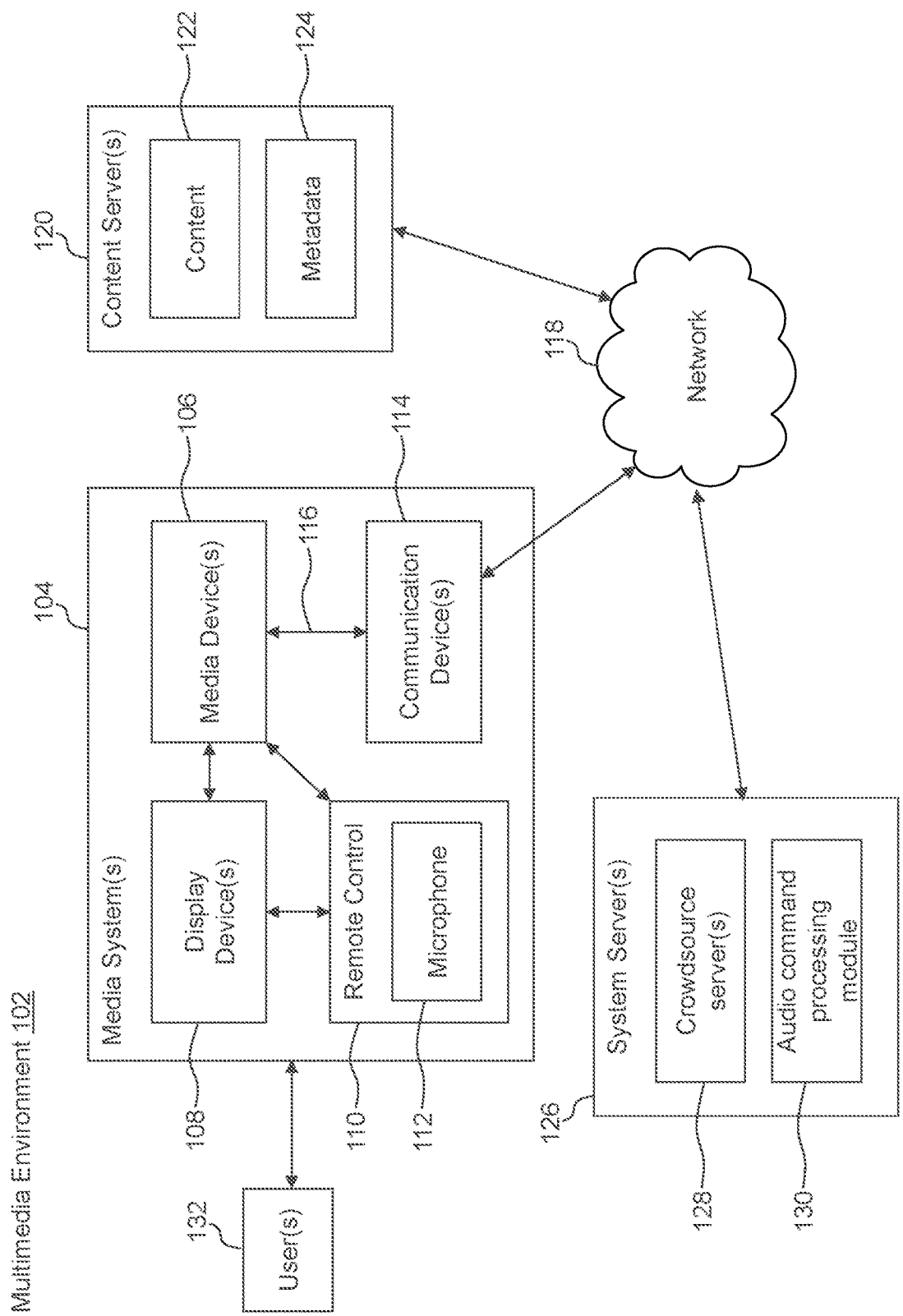
FIG. 1A illustrates a block diagram of a multimedia environment for detecting and switching wireless networks, according to some embodiments.

Various embodiments of this disclosure may be implemented using and/or may be part of a multimedia environment 102 shown in FIG. 1A, in some embodiments. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1A illustrates a block diagram of multimedia environment 102 for detecting and switching wireless networks, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a smart TV, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108. In some embodiments, media device 106 can include devices like home security panels, light switches, a wireless doorbell, a chomebook, IoT devices, home assistant devices, and/or phones (e.g., a smart phone) that can access non-media service(s) and/or media services. In some embodiments, a media device can be digital media player (e.g., streaming device or streaming box). The digital media player can be a consumer electronics device designed for the storage, playback, or viewing of digital media content.

Each media device 106 may be configured to communicate with network 118 via one or more communication device(s) 114. The communication device(s) 114 may include, for example, a cable modem, router, access point (AP), extender, and/or a satellite TV transceiver. The media device 106 may communicate with the communication device(s) 114 over link(s) 116, where the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using WiFi, cellular, Bluetooth, infrared, etc., or any combination thereof. The remote control 110 may include a microphone 112, which is further described below.

The multimedia environment 102 may include a plurality of content servers 120 (also called content providers or sources). Although only one content server 120 is shown in FIG. 1A, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie. This crowdsourcing example is described, for example, in U.S. Pat. No. 9,749,700 filed Nov. 21, 2016 and titled "Automatic Display of Closed Captioning Information."

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
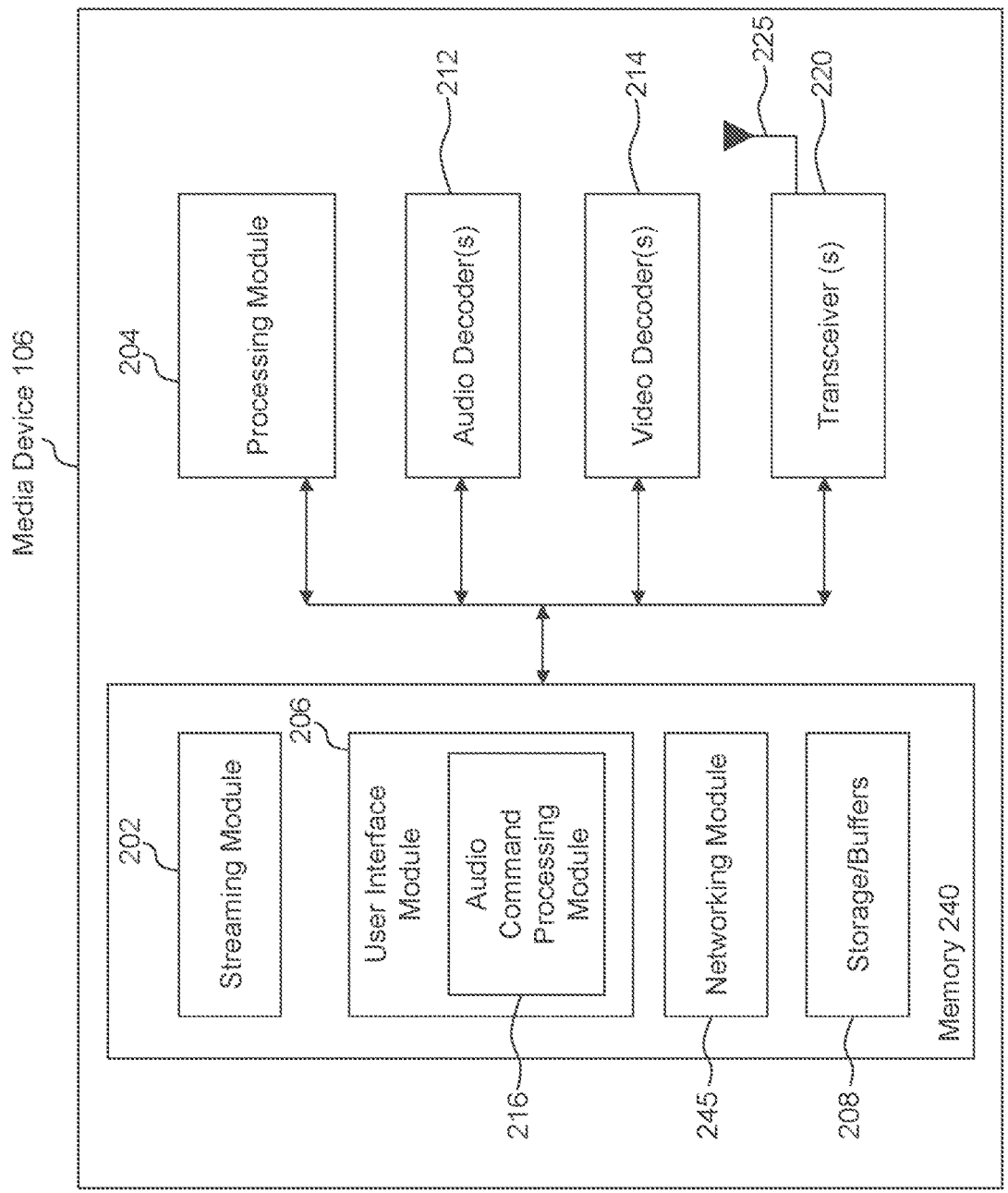
FIG. 2 illustrates a block diagram of an example media device for detecting and switching wireless networks, according to some embodiments.

In some embodiments, the audio data may be alternatively or additionally processed and analyzed by an audio command processing module 216 in the media device 106 (see FIG. 2). Media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106 for detecting and switching wireless networks, according to some embodiments. Media device 106 may include a streaming module 202, processing module 204, storage/buffers 208, and user interface module 206. As described above, the user interface module 206 may include the audio command processing module 216. Media device 106 may also include networking module 245 within memory 240, one or more transceiver(s) 220, and antenna 225.

One or more transceivers 220 transmit and receive communications signals that support detecting and switching wireless networks. According to some aspects, one or more transceivers 220 may be coupled to antenna 225. Antenna 225 may include one or more antennas that may be the same or different types. One or more transceivers 220 allow media device 106 to communicate with other devices that may be wired and/or wireless. In some examples, one or more transceivers 220 can include processors, controllers, radios, sockets, plugs, buffers, and like circuits/devices used for connecting to and communication on networks.

Memory 240 can include random access memory (RAM) and/or cache, and can include control logic (e.g., computer software) and/or data. Memory 240 can include other storage devices or memory such as, but not limited to, a hard disk drive and/or a removable storage device/unit. Memory 240 also includes storage/buffers 208. According to some examples, memory 240 can include an operating system (not shown). The operating system can manage transfer of data from memory 240 and/or one or more modules (e.g., Streaming Module 202, User Interface Module 206, and/or Networking Module 245) to Processing Module 204 and/or one or more transceivers 220. In some examples, an operating system maintains one or more network protocol stacks (e.g., Internet protocol stack, cellular protocol stack, and the like) that can include a number of logical layers. At corresponding layers of the protocol stack, the operating system includes control mechanism and data structures to perform the functions associated with that layer.

Networking module 245 can receive and analyze data from available wireless networks including the Current Network used by media device 106, to determine a Recommended Network that can enable media device 106 to access a desired media service compared to the available wireless networks. The determination of the Recommended Network can be based on: a signal quality of the second network and/or the capabilities of the communication device providing the second network; a correlation of any characteristics that indicate that credentials of a wireless network can be reused in another network (e.g., a pattern matching based on a SSID of the first network), and a stored password of the first network; a security level of the first network; and/or platform capabilities of media device 106. In some examples, Networking module 245 can control one or more transceivers 220.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Detecting and Switching Wireless Networks

Users may have more than one wireless network available, yet a media service may utilize a wireless network that does not satisfy media service quality. Consequently, the user experiences a media service of a less than desired quality. While some devices may indicate the presence of wireless networks, those devices do not distinguish which of those wireless networks are available for use.

Figure 1B:
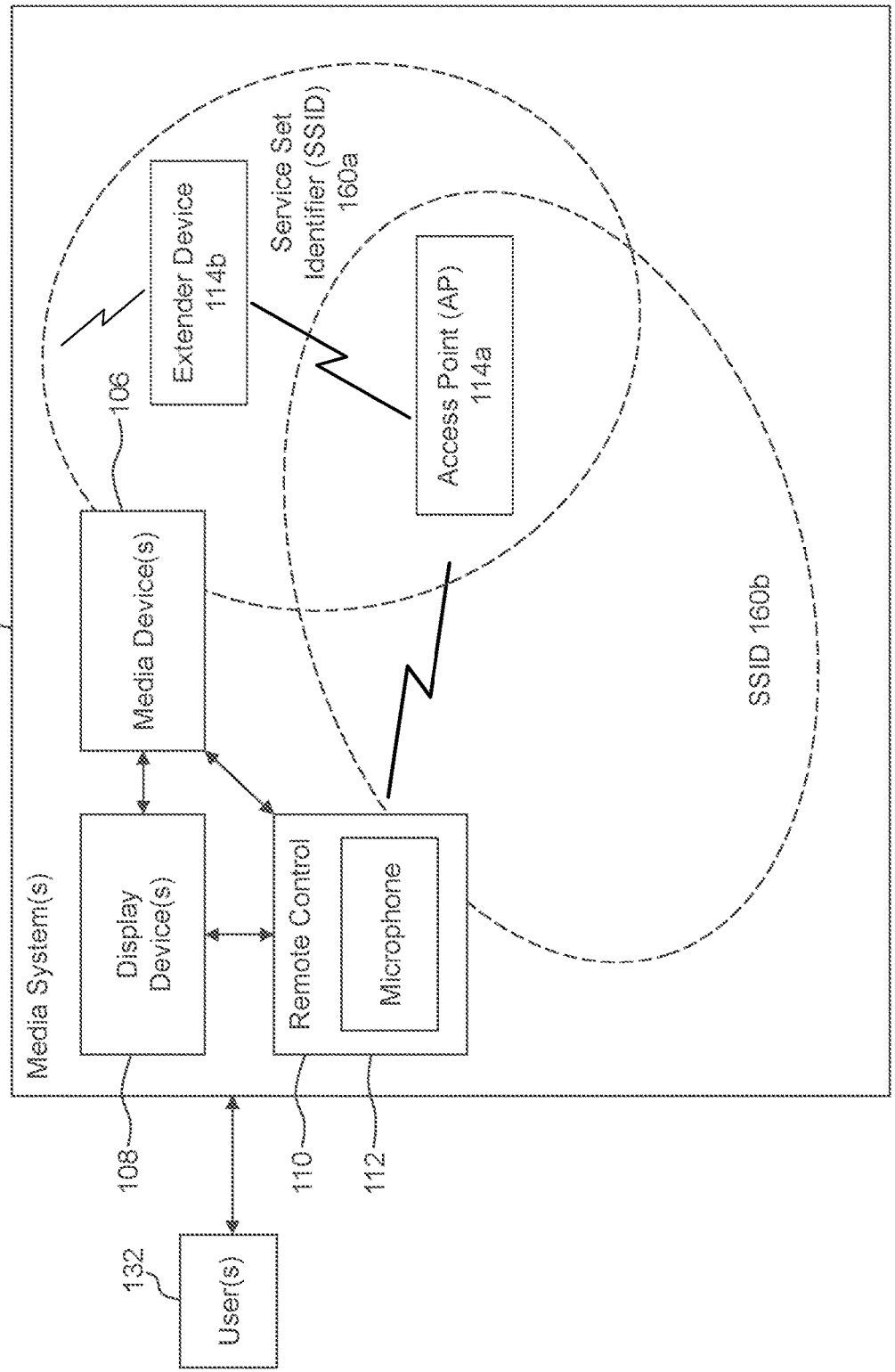
FIG. 1B illustrates a more detailed block diagram of a multimedia environment for detecting and switching wireless networks, according to some embodiments.

FIG. 1B illustrates a more detailed block diagram of multimedia environment 150 for detecting and switching wireless networks, according to some embodiments. Media system 104 includes several communication devices 114 including but not limited to: Access Point (AP) 114a and extender device 114b. AP 114a can provide a first wireless network identified by SSID 160a (e.g., wrt1100_2.4 GHz) in the 2.4 GHz frequency band, and extender device 114b can provide access to the first wireless network for devices that are farther away from AP 114a. In some examples, there may be a wall or furniture, or other obstruction such that extender device 114b extends the availability and access to the first wireless network identified by SSID 160a. AP 114a can also provide a second wireless network identified by SSID 160b (e.g., wrt1100_5 GHz) that can be on a different frequency such as 5 GHz frequency band. In some embodiments, the extender device 114b can provide access to a third wireless network, identified by SSID 160c (not shown). One skilled in the relevant arts will appreciate that other network configurations are usable within the scope of this disclosure, such as wireless mesh networks (with wired or wireless backhaul channels), multiple separate APs, or other variations.

Even though media device 106 can be configured to utilize both the first and the second wireless networks (e.g., media device 106 has both 2.4 GHz and 5 GHz radios, and a user of media device 106 knows any needed access credentials, e.g., login credentials for both networks), media device 106 may utilize the first wireless network, SSID 160a to access media service from network 118. Media device 106 can access the media service, decode the media service, and transmit the content of the media service to display device 108, even though utilizing the second wireless network, SSID 160b may result in a higher quality media service. For example, if media device 106 is sufficiently close to AP 114a or extender device 114b, connecting at 5 GHz on SSID 160b might provide higher bandwidth communications than the 2.4 GHz channel that is typically more congested. Alternatively, if media device 106 is connected to SSID 160b, but is far enough away from AP 114a or extender device 114b such that the 5 GHz channel provides weak or intermittent connectivity compared to a reliable 2.4 GHz channel, connecting to SSID 160a might provide improved reliability for communications.

Some embodiments enable media device 160 to detect the second wireless network, determine that the second wireless network would provide a higher quality of media service, and switch from the first wireless network, SSID 160a, to provide media service via the second wireless network, SSID 160b. In some embodiments, the determination regarding a higher quality of media service also includes a determination that the second wireless network has the same or greater security policy or security features as the first wireless network. In some embodiments, the switch occurs without user input. In some embodiments, a Recommended Network is presented with selectable choices on display device 108 for a user to decide which wireless network (or wired network) is utilized for media service.

Figure 3:
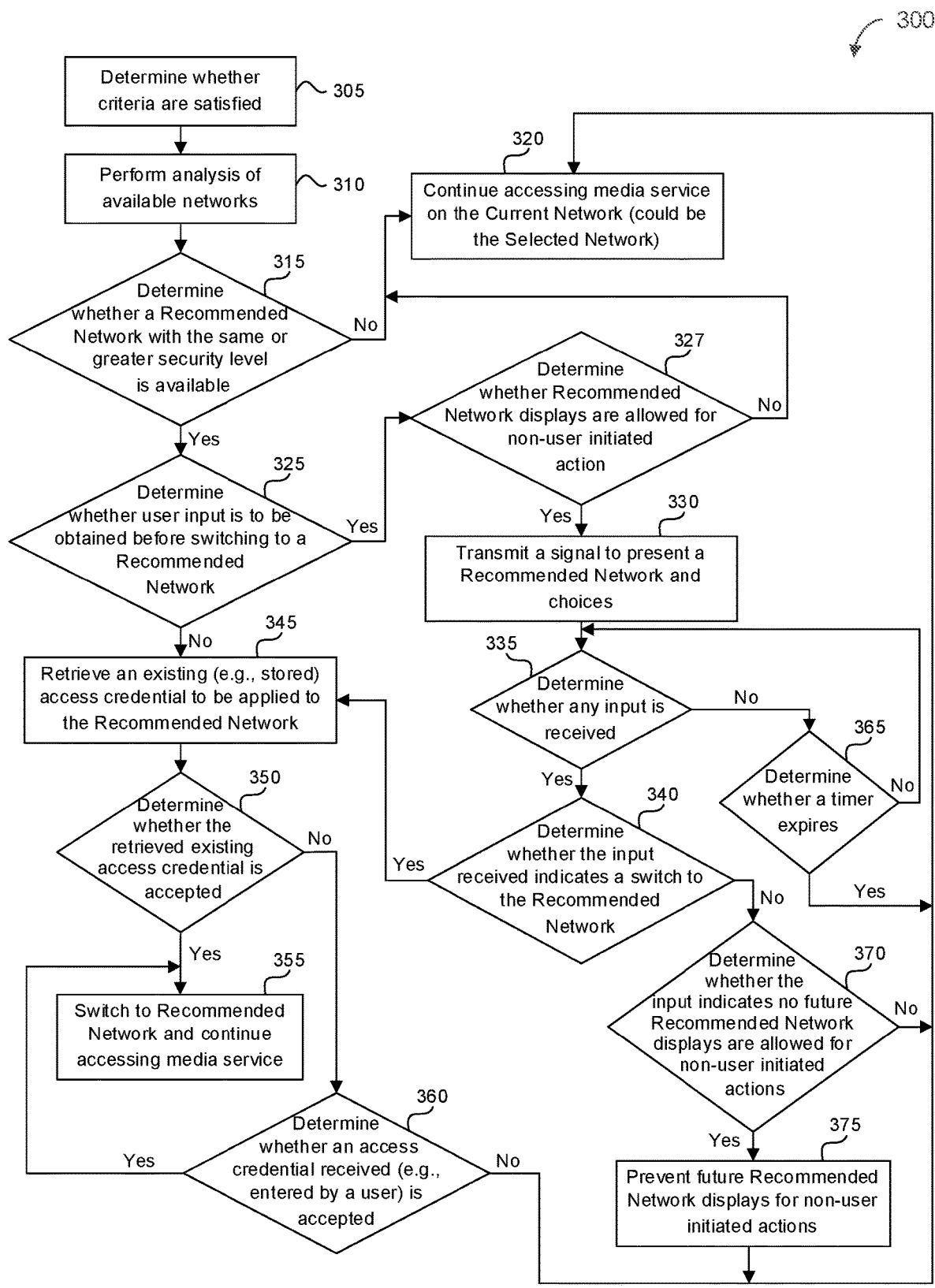
FIG. 3 illustrates an example method for a media device for detecting and switching wireless networks, according to some embodiments.

FIG. 3 illustrates example method 300 for media device 106 detecting and switching wireless networks, according to some embodiments. As a convenience and not a limitation, method 300 can be described with elements of FIGS. 1A, 1B, and 2. For example, method 300 can be performed by media device 106 of FIG. 1A, 1B, and 2.

At 305, media device 106 determines that criteria are satisfied that may trigger analysis to determine available networks. In some examples, the criteria satisfied can be a user-initiated action such as the selection of a Setup Connection (e.g., a menu item) to choose a wireless network when a user is configuring a media service for the first time, or a Check Connection item when media service has been established with a wireless network and a user is checking to see if the network connection is working well. In some examples the criteria satisfied are not user-initiated actions, but physical layer and/or application layer measurements that satisfy (e.g., meet and/or exceed) one or more configurable thresholds. For example, while a media service provided by media device 106 via a first wireless network, SSID 160a, is in progress, (e.g., a movie is shown on display device 108) a number of rebuffering events can occur within the movie (e.g., within the same session.) When a rebuffering event occurs, playback of the movie is stopped. When the number of rebuffering events (e.g., 4 times within a session) satisfies a configurable threshold value, the criteria can be determined to be satisfied. In some embodiments, while the media device is streaming audio to a mobile device or to a wireless remote control, audio underrun events or perceptible audio dropouts may occur. When the number of audio underruns or dropouts (e.g., 4 times in a session) satisfies a configurable threshold value, the criteria can be determined to be satisfied. In some embodiments, other criteria can be used, based on media performance (for example, video bitrates or video start times). When the media performance drops below a configurable threshold value (for example, video bitrate drops below 3 megabits per second, or video start time exceeds 5 seconds), the criteria can be determined to be satisfied. In some embodiments, other criteria can be used, based on network performance (for example, network disconnection events, or channel congestion or contention, or reductions in wireless signal quality). When the network performance drops below a configurable threshold value (for example, 4 or more network disconnection events within 24 hours, or a drop in the signal to noise ratio to below 10 dB, or an airtime utilization level greater than 30% for more than an hour), the criteria can be determined to be satisfied. A variety of other criteria can be used, based on network conditions, network performance, or network metrics (e.g., characteristics or attributes of the network performance including but not limited to network speed, network jitter, packet loss, and/or latency affect) or media streaming performance, or combinations of thereof, as would be apparent to those skilled in the art. In some embodiments the criteria can be independent of the media service. In some embodiments, the criteria being satisfied triggers a network recommendation logic when the network performance or streaming performance on the Current Network falls below a threshold. In some embodiments, the criteria can include whether a network delay is detected during prebuffering. When the criteria are satisfied, method 300 proceeds to 310.

At 310, media device 106 performs analysis of available networks. For example, media device 106 can receive and analyze data from available wireless networks including the Current Network (e.g., SSID 160*a*, wrt1100_2.4 GHz) used by media device 106, to determine a Recommended Network that can enable media device 106 to improve access to the media service compared to utilizing the other available wireless networks. The determination of the Recommended Network can be based on: a signal quality of the available networks; noise, interference or channel utilization characteristics of the available networks; operating channel or frequency band of the available networks; preferences for a channel or frequency band, as specified by the user or by a network operator, or programmed within the device; and/or the capabilities of the communication device (e.g., AP 114*a*) providing the available networks; correlation of any characteristics that indicate that credentials of a first wireless network can be reused in another wireless network (e.g., a pattern matching based on a portion of the SSID of the first wireless network (e.g., "wrt1100"), and a stored access credential of the first wireless network); optionally, a security level of the first wireless network; and/or platform capabilities of media device 106. Based on this analysis, an available network can be Recommended if the available network can offer better performance.

At 315, media device 106 determines based on the analysis above, whether a Recommended Network with the same or greater security level is available. When a Recommended Network is available, method 300 proceeds to 325. Otherwise, method 300 proceeds to 320. In some embodiments, the security determination is optional (e.g., bypassed) and method 300 proceeds to 325.

In some embodiments, 310 and 315 can include the following: (1) determining if there are any Matching Networks that match the SSID pattern match and/or security settings based on the SSID and security settings for the Current Network; (2) measuring the performance characteristics for the Matching Networks, and compare against the Current Network; (3) identifying any Matching Networks that offer the best performance among all the Matching Networks; and/or (4) determining if the best Matching Network offers better performance than the Current Network. If so, determining that the best Matching Network is a Recommended Network.

At 320, media device 106 continues accessing media service on the Current Network. For example, none of the other available networks analyzed are determined to provide a quality of service higher than that of the Current Network, and/or none of the other available networks analyzed have a same or higher level of security as the Current Network.

At 325, media device 106 determines whether user input is to be obtained before switching to a Recommended Network. When user input is not needed, method 300 proceeds to 345. When user input is to be obtained, method 300 proceeds to 327.

At 327, media device 106 determines whether Recommended Network displays are allowed for non-user initiated action. For example, if a user previously indicated that they do not wish for any future Recommended Network displays to occur, media device 106 can set a flag, to prevent any Recommended Network displays from being presented to the user, and method 300 proceeds to 320 to continue service on the Current Network. When Recommended Network displays are allowed, method 300 proceeds to 330.

At 330, media device 106 transmits a signal to present a Recommended Network and choices. For example, media device 106 can transmit a signal to display device 108 indicating but not limited to: the Recommended Network (e.g., SSID 160*b*, wrt1100_5 GHz) and may include an assessment of the potential service quality (e.g., excellent, good); the Current Network (e.g., SSID 160*a*, wrt1100_2.4 GHz) and corresponding assessment; and a selection of choices. The choices can include but are not limited to: Switch to the Recommended Network, remain on the Current Network, and/or do not show any future Recommended Network displays for non-user initiated actions.

At 335, media device 106 determines whether any input is received from the user in response to the signal transmitted at 330. When no input is received, method 300 proceeds to 365. When an input is received, method 300 proceeds to 340.

At 340, media device 106 determines whether the input received indicates a switch to the Recommended Network. When the input indicates a switch, method 300 proceeds to 345. Otherwise, method 300 proceeds to 370.

At 345, media device 106 retrieves an existing (e.g., stored) access credential to be applied to the Recommended Network. For example, media device 106 can retrieve an existing access credential of the first wireless network (e.g., SSID 160*a*, wrt1100_2.4 GHz) and apply the retrieved access credential as a access credential that is also common or shared with the Recommended Network (e.g., SSID 160*b*, wrt1100_5 GHz).

At 350, media device 106 determines whether the retrieved existing access credential is accepted. For example, media device 106 can transmit a signal to present the retrieved existing access credential on display device 108 for the user to apply, or allow the user to enter an access credential (e.g., enter a password via a displayed keyboard.) In some embodiments, entering access credentials can include granting permission to share the credentials with media device 106 and/or display device 108. The retrieved existing access credential can be displayed or hidden (e.g., starred out.) If the user chooses to apply the retrieved existing access credential and the retrieved existing access credential is indeed a common access credential to the Recommended Network, method 300 proceeds to 355. Otherwise, method 300 proceeds to 360. In some embodiments, at 350 media device 106 determines whether credentials are available for the Recommended Network. Determining whether the credentials are available for the Recommended Network can include determining whether connected devices have the credentials for the recommended network and whether the connected devices are configured to share those credentials. In some embodiments media device 106 can request the credentials from other connected devices such as a mobile phone. In some embodiments a connected device is configured to share the credentials with media device 106, and the credentials can be sent to media device 106. In some embodiments, where the connected device is not configured to automatically share the credentials with media device 106, a message can be transmitted to the connected device (e.g., and presented on a display of the connected device) requesting permission to share the credentials. For example, if a mobile phone has the credentials, a request from media device 106 for the credentials can cause a message to be displayed on the mobile phone requesting permission (e.g., selection of a selectable item on the mobile phone display) to share the credentials. In an example, a selection from the mobile phone display, can grant permission in response to the request to share credentials and the credentials can be shared with media device 106.

In some embodiments, the credentials for a Recommended Network can be identified by attempting to access the Recommended Network by testing whether one or more credentials of other networks permit access to the Recommended Network. In some embodiments, the Recommended Network uses passwordless authentication, and a request to share authentication information can be transmitted by media device 106 to another device. For example, if the passwordless authentication associated with the Recommended Network uses inherence factors (e.g., fingerprints, retinal scans, face or voice recognition) a request for a fingerprint can be sent to a user device, and in response to a user providing the fingerprint on the user device, the fingerprint information can be sent to media device 106. Media device 106 can then use the fingerprint information to authenticate the media device to access the Recommended Network.

At 355, media device 106 switches to the Recommended Network (e.g., SSID 160b, wrt1100_5 GHz) and continues accessing media service via the Recommended Network.

At 360, the retrieved existing access credential is not the access credential for the Recommended Network, and media device 106 determines whether an access credential received (e.g., a password is entered by a user) is accepted. For example, media device 106 can cause a presentation on display device 108 of a keyboard for the user to enter the access credential for the Recommended Network. When the access credential for the Recommended Network is received and accepted, method 300 proceeds to 355. In some embodiments, a record for the newly entered access credential for the Recommended Network (e.g., a second wireless network) can be generated and stored. Otherwise, method 300 proceeds to 320 to continue to access media service via the Current Network. In some examples the input credentials may be incorrect and method 300 presents an opportunity (e.g., an onscreen keyboard) for the user to enter the correct input credentials.

At 365, media device 106 determines whether a timer expires. For example, a timer may be set for a number of seconds for user input to be received. If the timer is not expired, method 300 returns to 335 to await user input. When the timer expires, method 300 proceeds to 320.

At 370, media device 106 determines whether the input received indicates no future Recommended Network displays are allowed for non-user initiated actions. For example, when the user indicates they do not wish to receive any further Recommended Network displays, method 300 proceeds to 375. Otherwise, method 300 proceeds to 320.

At 375, media device 106 prevents future Recommended Network displays for non-user initiated actions. For example, media device 106 can set a flag or value to prevent future Recommended Network displays. The flag or value can remain set even when media device 106 is powered down and restarted.

Figure 4:
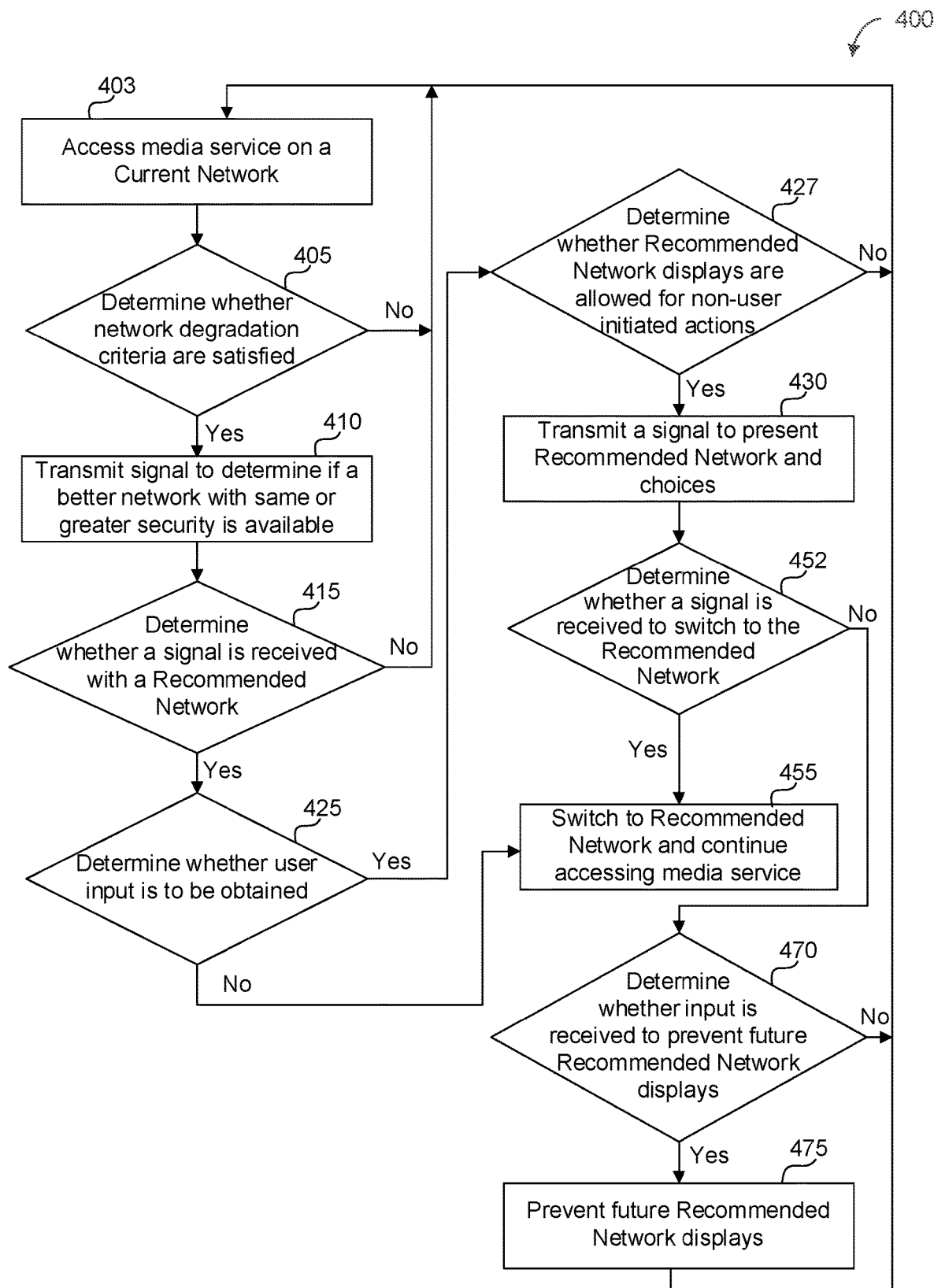
FIG. 4 illustrates an example method for a Streaming Module for detecting and switching wireless networks, according to some embodiments.

FIG. 4 illustrates example method 400 for streaming module 202 for detecting and switching wireless networks, according to some embodiments. As a convenience and not a limitation, method 400 can be described with elements of FIGS. 1A, 1B, 2, and 3. For example, method 400 can be performed by streaming module 202 of FIG. 2 within media device 106.

At 403, streaming module 202 accesses media service on a Current Network (e.g., a first wireless network, SSID 160a, wrt1100_2.4 GHz.) The Current Network can be a wireless network that was previously selected during a Setup Connection process, for example.

At 405, streaming module 202 determines whether wireless network degradation criteria corresponding to an SSID are satisfied (e.g., a criteria value is equal to or exceeds a configurable threshold value.) For example, wireless network degradation criteria can include but are not limited to the following: a number of rebuffering events occurring during a session (e.g., during a movie) or over a defined period of time; a number of rebuffering events per unit time during a session or over a defined period of time; a duration of a rebuffering event; and/or degradations in a signal strength indicator, a packet error rate indicator, a channel congestion indicator or other wireless quality indicators for the Current Network. For example, when the media service accessed on Current Network decreases, the playback of the content (e.g., movie) may be paused and then begin again. After a number of pauses, a wireless network degradation criteria may satisfied and method 400 proceeds to 410. Otherwise, method 400 returns to 403 to continue accessing service on the Current Network.

At 410, streaming module 202 transmits a signal to determine if a better network (e.g., alternative network) is available (optionally with a requirement that the better network have the same or greater security level), that may enable access to a more desired media service quality. For example, streaming module 202 can transmit a signal to networking module 245 requesting a Recommended Network.

At 415, streaming module 202 determines whether a signal is received that includes a Recommended Network. For example, streaming module 202 can receive a signal from networking module 245 indicating that Recommended Network (a second wireless network, SSID 160b, wrt1100_5 GHz) is available. In some embodiments, the Recommended Network has at least the same security level as the Current Network. In some embodiments, the signal may include an assessment value of the Recommended Network (e.g., excellent, good).

At 425, streaming module 202 determines whether user input is to be obtained. When user input is not needed, method 400 proceeds to 455. When user input is needed, method 400 proceeds to 427. In some embodiments, a presentation can be made on display device 108 and a user can provide input to make this determination.

At 427, streaming module 202 determines whether Recommended Network displays are allowed for non-user initiated actions. For example, if a user previously indicated that future Recommended Network displays for non-user initiated actions are not allowed, method 400 returns to 403 to continue utilizing the Current Network to enable access to the media service. When Recommended Network displays are allowed, method 400 proceeds to 430.

At 430, streaming module 202 transmits a signal to present Recommended Network and choices. For example, streaming module 202 can transmit a signal to user interface module 206 with the Recommended Network and choices for presentation to a user via display device 108.

At 452, streaming module 202 determines whether a signal is received to switch to the Recommended Network. For example, user interface module 206 may transmit to streaming module 202, input from a user. The user input may be in response to information User Interface Module caused to be presented on display device 108 to switch to the Recommended Network, and method 400 proceeds to 455. Otherwise, method 400 proceeds to 470.

At 470, streaming module 202 determines whether input is received to prevent future Recommended Network displays. For example, streaming module 202 may receive information from user interface module 206 that the user does not wish to receive any Recommended Network displays in the future, and method 400 proceeds to 475. Otherwise, method 400 proceeds to 403.

At 475, streaming module 202 prevents future Recommended Network displays. For example, streaming module 202 may set a flag or indication accordingly, and method 400 returns to 403.

Returning to 455, streaming module 202 switches to the Recommended Network and continues enabling access to media service via the Recommended Network (e.g., SSID 160b, wrt1100_5 GHz.) In this example, an existing access credential for the Current Network is also the access credential for the Recommended Network. In some embodiments, if an existing access credential for the Current Network is not the access credential for the Recommended Network, method 400 can cause a presentation of a keyboard on display device 108 via user interface module 206 to obtain the access credential for the Recommended Network from the user.

Figure 5:
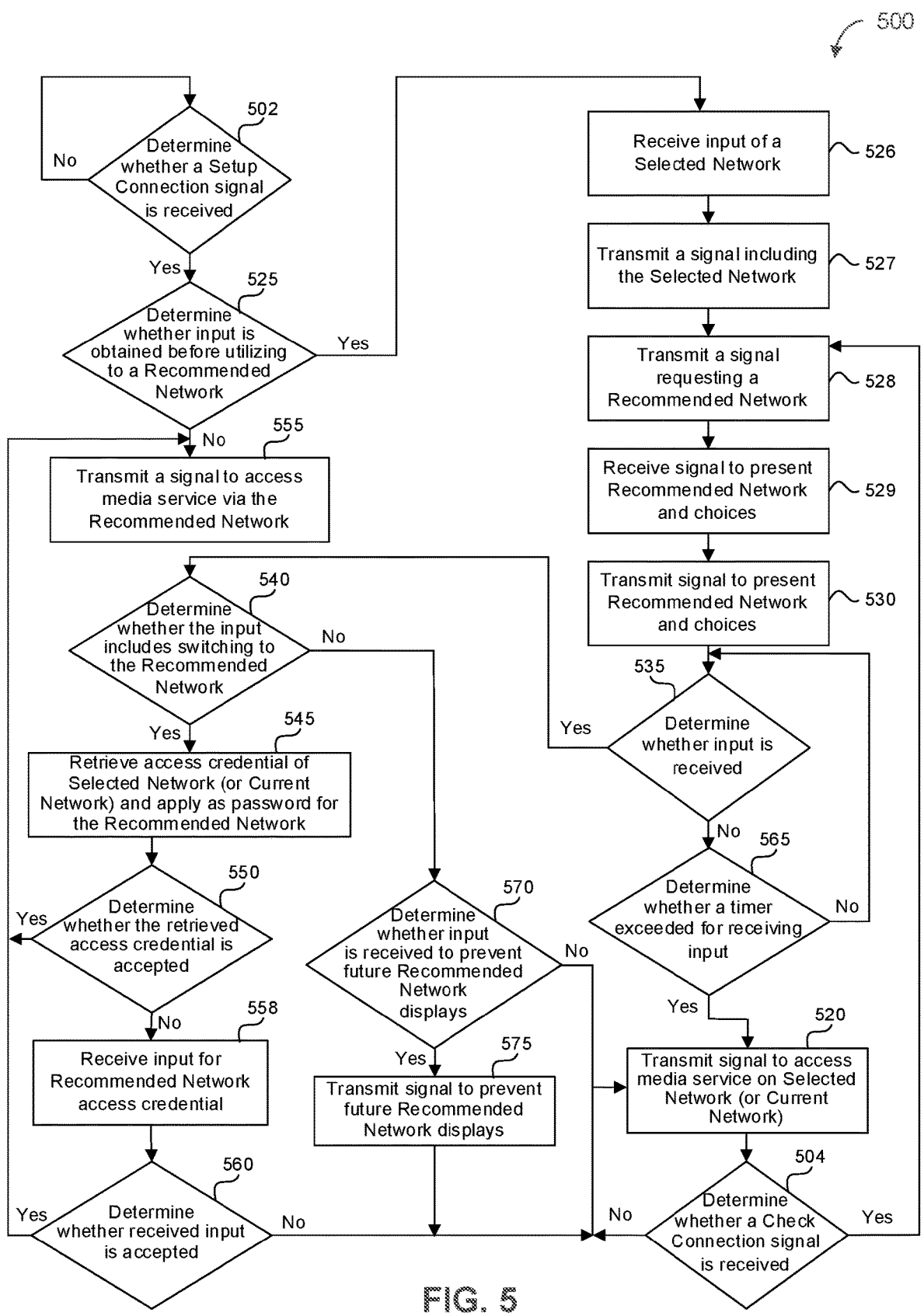
FIG. 5 illustrates an example method for a User Interface Module for detecting and switching wireless networks, according to some embodiments.

FIG. 5 illustrates an example method for a User Interface Module for detecting and switching wireless networks, according to some embodiments. As a convenience and not a limitation, method 500 can be described with elements of other figures in the disclosure. For example, method 500 can be performed by user interface module 206 of FIG. 2 within media device 106.

At 502, user interface module 206 determines whether a Setup Connection signal is received. For example, when a user is setting up media service for the first time, user interface module 206 can cause the presentation of a Setup Connection selectable item to be displayed on display device 108. When the user chooses the Setup Connection selectable item, method 500 proceeds to 525. Otherwise, method 500 remains at 502.

At 525, user interface module 206 determines whether user input is obtained before utilizing a Recommended Network. For example, when user input is not needed, method 500 proceeds to 555 to access media service via a Recommended Network. Otherwise, method 500 proceeds to 526.

At 526, user interface module 206 receives input of a Selected Network. For example, user interface module 206 can cause a presentation of available networks on display device 108, and receive a user input of one of the available networks referred to as the Selected Network (e.g., a first wireless network, SSID 160a, wrt1100_2.4 GHz.)

At 527, user interface module 206 transmits a signal including the Selected Network. For example, the signal including the Selected Network can be transmitted to streaming module 202, and streaming module 202 can transmit the Selected Network to Networking Module 245.

At 528, user interface module 206 transmits a signal requesting a Recommended Network. For example, the signal including the request for a Recommended Network can be transmitted to streaming module 202, and streaming module 202 can transmit the request for a Recommended Network to Networking Module 245.

At 529, user interface module 206 receives a signal to present Recommended Network (e.g., SSID 160b, wrt1100_5 GHz) and choices (e.g., Selected Network). For example, user interface module 206 can receive the signal from streaming module 202 in response to 527 and/or 528.

At 530, user interface module 206 transmits a signal to present Recommended Network and choices on display device 208. The choices can include, for example, the Selected Network, the Recommended Network, and corresponding assessment values (e.g., excellent, good, fair.)

At 535, user interface module 206 determines whether input is received from a user in response to the presented Recommended Network and choices on display device 208. When an input is received, method 500 proceeds to 540. Otherwise, method 500 proceeds to 565.

At 540, user interface module 206 determines whether the user input includes switching to the Recommended Network. When the user input includes switching to the Recommended Network, method 500 proceeds to 545. Otherwise (e.g., the user input can include the Selected Network being chosen), method 500 proceeds to 570.

At 545, user interface module 206 retrieves an access credential of the Selected Network (or Current Network if this is in response to a Check Connection selection) and applies the retrieved access credential as the access credential for the Recommended Network. The retrieval and application of an existing access credential is useful, especially when the Recommended Network has not been utilized before by media device 106. In some embodiments, user interface module 206 can retrieve the access credential for the Recommended Network (e.g., if media device 106 has utilized the Recommended Network before.)

At 550, user interface module 206 determines whether the retrieved access credential is accepted. When the retrieved access credential is accepted, user input is not needed and method 500 proceeds to 555. Being able to switch the media service to the Recommended Network to obtain a more desired service quality without having to enter an access credential has the benefit of being faster than obtaining user input. Thus, this embodiment takes advantage of commonly shared passwords among networks that have some correlation. The correlation may be based on a pattern match of a string of characters, for example. When the retrieved access credential is not accepted, method 500 proceeds to 558.

At 558, user interface module 206 receives input for the Recommended Network password. For example, user interface module 206 may cause a keyboard to be presented on display device 108, and user input may be received via remote control 110. The user input can include the access credential for the Recommended Network.

At 560, user interface module 206 determines whether the received input is accepted. When the user input access credential for the Recommended Network is accepted, method 500 proceeds to 555. Otherwise, method 500 proceeds to 520.

At 555, user interface module 206 transmits a signal to access media service via the Recommended Network. For example, user interface module 206 can transmit a signal to streaming module 202 to utilize the Recommended Network, and streaming module 202 can relay the information to networking module 245 to utilize the Recommended Network for accessing media service instead of the Selected Network.

At 565, user interface module 206 determines whether a timer exceeded for receiving input. For example, if a user has not provided a selection from those described in 530, and a timer has not been exceeded, method 500 returns to 535 to wait for input. Otherwise, when the user has not provided a selection and the timer is exceeded, method 500 proceeds to 520.

At 520, user interface module 206 transmits a signal to access media service on Selected Network (or the Current Network if media service has been set up before). For example, user interface module 206 can transmit a signal to streaming module 202 to utilize the Selected or Current Network, and streaming module 202 can transmit the information to networking module 245 to utilize the Selected (or Current) Network for accessing media service.

At 504, user interface module 206 determines whether a Check Connection signal is received. For example, a user may verify network connectivity and performance for the Current Network. When user interface module 206 receives a Check Connection signal, method 500 proceeds to 528. Otherwise, method 500 returns to 520.

At 570, user interface module 206 determines whether input is received to prevent future Recommended Network displays. In some embodiments, a user can restrict Recommended Network displays for user-initiated actions (e.g., Check Connection input) where the switch to the Recommended Network occurs without any display notifications. When input is received to prevent future Recommended Network displays, method 500 proceeds to 575. Otherwise, method 500 proceeds to 520.

At 575, user interface module 206 Transmit signal to prevent future Recommended Network displays. For example, user interface module 206 can transmit a signal to streaming module 202 to set a flag or indication accordingly.

Figure 6:
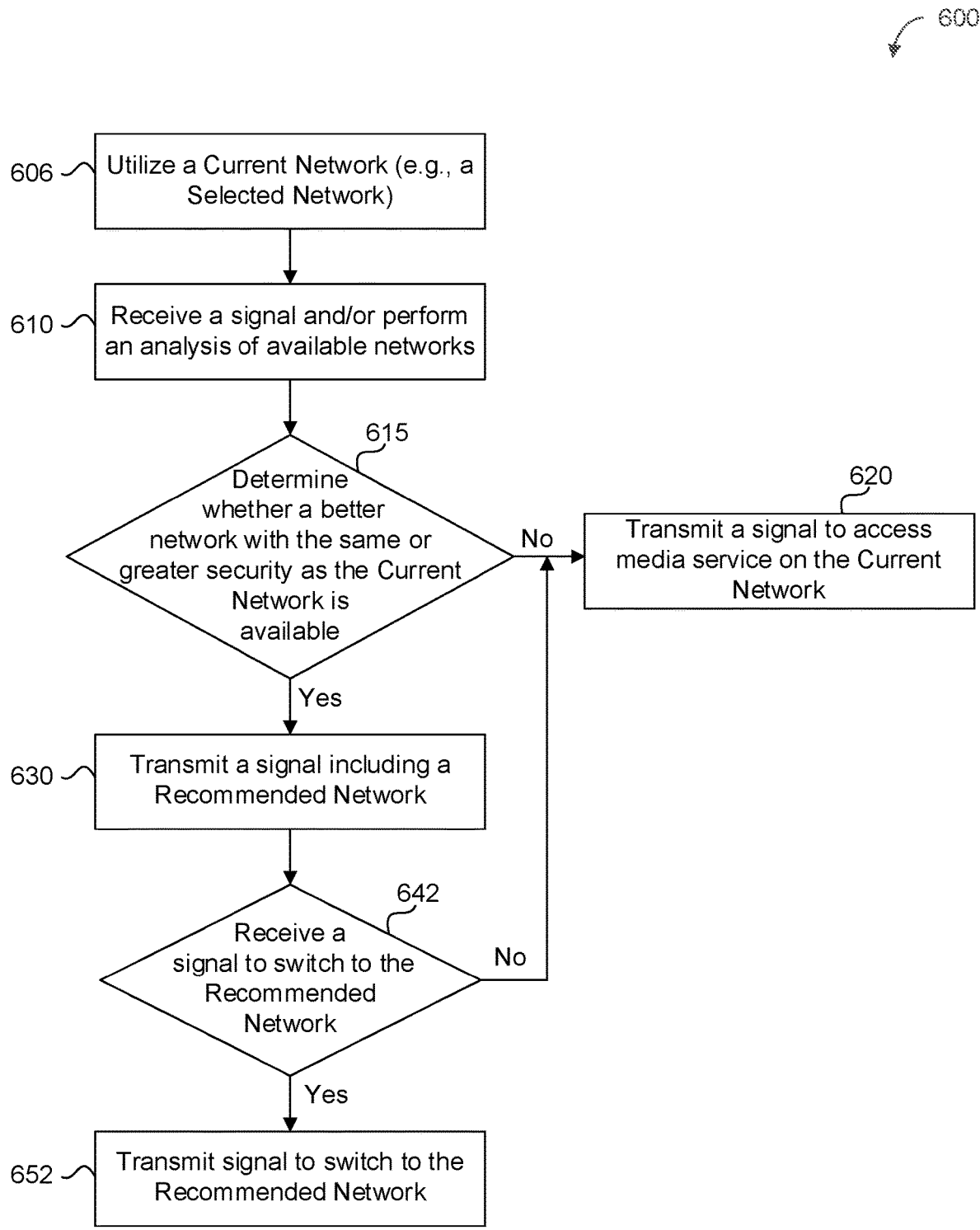
FIG. 6 illustrates an example method for a Network Module for detecting and switching wireless networks, according to some embodiments.

FIG. 6 illustrates an example method for Network Module 245 for detecting and switching wireless networks, according to some embodiments. As a convenience and not a limitation, method 600 can be described with elements of other figures in the disclosure. For example, method 600 can be performed by Network Module 245 of FIG. 2 within media device 106.

At 606, Network Module 245 utilizes a Current Network or for setting up media service for the first time, receives a signal to possibly use a Selected Network for media service. The Current or Selected Network can be, for example, a first wireless network (e.g., SSID 160*a*, wrt1100_2.4 GHz.)

At 610, Network Module 245 receives a signal requesting a Recommended Network and/or performs an analysis of available networks. For example, Network Module 245 can receive a request from streaming module 202 to perform an analysis of available networks in response to a user-initiated action (e.g., Setup Connection or Check Connection) or in response to network degradation criteria being satisfied.

At 615, Network Module 245 determines whether a better network with the same or greater security as the Current Network is available. For example, networking module 245 can receive and analyze data from available wireless networks including the Current Network used by media device 106, to determine a Recommended Network that can enable media device 106 to access a more desirable media service quality compared to the available wireless networks. The determination of the Recommended Network can be based on: a signal quality of available networks (e.g., SSID 160*b*, wrt1100_5 GHz); noise, interference or channel utilization characteristics of the available networks; operating channel or frequency band of the available networks; preferences for a channel or frequency band, as specified by the user or by a network operator, or programmed within the device; and/or the capabilities of the communication device providing the second network (e.g., AP 114*a*); correlation of any characteristics that indicate that credentials of a wireless network can be reused in another network (e.g., a pattern matching based on a portion of the SSID of the first network (e.g., "wrt1100"), and a stored access credential of the first network (e.g., SSID 160*a*, wrt1100_2.4 GHz)); a security level of the first network; and/or platform capabilities of media device 106.

Networking module 245 can perform background scanning for various wireless networks, receive, store, and compare physical layer, link layer, and network layer measurements (e.g., received signal strength indication (RSSI), packet error rates (PER), airtime utilization, noise). Networking module 245 can analyze measurements (e.g., the RSSI values) and assign assessments to available SSIDs (e.g., good, fair, excellent). For example, networking module 245 can translate an RSSI value to an estimated streaming speed quality (e.g, −61 dbm can be translated to 55 Mbps.) Further, the streaming speed quality can be assigned an assessment of "good". The assessment information can be presented on display device 108 along with the assessment for the Current Network for a user to make a selection (e.g., via remote control 110 or touchscreen entry on display device 108.) In some embodiments the streaming speed quality (e.g., a SpeedScore metric) for comparing available networks and identifying one or more Recommended Networks that can provide better performance than the Current Network, includes wireless quality indicators including but not limited to: wireless signal strength, packet error rate, airtime utilization, noise, interference, wireless router capabilities, device radio capabilities, and/or supported wireless protocols.

Networking module 245 can cause control transceiver 220 to transmit probe requests, receive responses regarding metadata such as communication device 114 capabilities including but not limited to: the protocol standards supported, security level of the wireless networks provided, SSIDs, number of antennas, media access control (MAC) address, manufacturer type, serial number, location information (e.g, a global positioning system (GPS) location), time of flight (ToF) data, bandwidth, and/or frequency supported.

Networking module 245 can perform correlation of any characteristics that indicate that credentials of a wireless network can be reused in another network (e.g., WiFi, mobile network, cellular, hotspot, and/or wireline). For example, networking module 245 can perform pattern matching across SSIDs to detect if two or more SSIDs may share a common access credential. In some examples, communication devices 114 may provide two or more wireless networks, sometimes on different frequency bands. To simplify usage, the two or more wireless networks may share a common access credential. Some embodiments take advantage of the potentially shared common access credential to enable a seamless switch from one wireless network to another without user input. For example, media device 106 may provide media service via a first wireless network with an SSID of wrt1100_2.4 GHz, and the corresponding access credential may be stored in memory 240 (e.g., storage/ buffers 208). Networking module 245 may perform pattern matching on a subset of the SSID, wrt1100_2.4 GHz, including but not limited to: prefix matching, postfix matching, and/or matching on a string of characters (e.g., regular expression (Regex)). Networking module 245 may detect a second wireless network, SSID wrt1100_5 GHz. If SSID wrt1100_5 GHz is determined to be the Recommended Network, even if media device 106 may not have connected to SSID wrt1100_5 GHz before, media device 106 can retrieve and apply the access credential of SSID of wrt1100_2.4 GHz as the access credential for SSID wrt1100_5 GHz. See 545 and 550 of FIG. 5. If the application of the retrieved access credential is successful, user input is not needed to switch from the first wireless network to the second wireless network.

In some embodiments, networking module 245 can correlate two or more separate SSIDs based on other characteristics as being accessible for transporting media service data. For example, being an accessible SSID can include an SSID that is associated with: the first wireless network, communication device 114 associated with the first wireless network (e.g., AP 114*a* or extender 114*b*) such as a Media Access Control (MAC) address or common manufacturer, a customer account corresponding to media device 106.) In some examples, an accessible SSID can include the same SSID but on a different frequency channel. In some examples, an SSID may be correlated with a cellular network and media device 106 can select the cellular network as the transport network over which media device 106 can access the media service. For example, a first wireless network may be correlated with a hotspot network identifier that is provided via a cellular network, where the first wireless network and the hotspot network identifier are correlated (e.g., prefix, postfix, and/or pattern match on a subset of the first wireless network's SSID) and the stored access credentials of the first wireless network can be applied as access credentials of the hotspot network. Thus, the user is able to access the media service via the hotspot network. In some examples, if the access credentials are different, a user can be prompted to provide access credentials (e.g., via user interface module 206 similar to FIG. 5 at 558.)

In some embodiments, the user may be prompted to select the Recommended Network (see 630 below) before attempting to connect to the Recommended Network. This prompting may occur in situations where automatically switching to the recommended network may be undesirable, such as based on legal restrictions in a geographical region where the media device 106 is located, or when viewing certain applications where a prompt might be disruptive to a user experience.

In some embodiments, networking module 245 can switch from a first wireless network to another network the networking module 245 has previously connected (e.g., the access credentials of the previously accessed networks are stored and retrievable for use.) In some embodiments, networking module 245 can temporarily switch from a first wireless network to a second network, and then to a third network where the user continues to access media service seamlessly. For example, networking module 245 can switch from a first wireless network to a hotspot network where the user is able to access the media service, and subsequently switch to a Recommended Network so that the user can continue to access the media service seamlessly.

Optionally, networking module 245 can compare security levels of the available wireless networks to ensure that the Recommended Network has the same level of security or greater security level than the Current Network or Selected Network. Examples of WiFi security include but are not limited to: Wired Equivalent Privacy (WEP), Wi-Fi Protected Access (WPA), and Wi-Fi Protected Access version 2 (WPA2).

Networking module 245 can also compare the data corresponding to the communication device 114 capabilities with media device 106 platform capabilities to determine a Recommended Network that may enable media device 106 to access a higher quality media service compared to other available networks (wireless or wired). For example, based on platform capabilities of media device 106, media 106 may select the Recommended Network based on but not limited to the following criteria: the protocol standards supported, security level of the wireless network provided, SSID, number of antennas, media access control (MAC) address, manufacturer type, serial number, location information (e.g, a global positioning system (GPS) location), time of flight (ToF) data, bandwidth, and/or frequency supported.

Based on the analysis and comparison of one or more of the elements described above, if Networking module 245 determines that a better network (e.g., a Recommended Network) is not found, method 600 proceeds to 620. Otherwise, method 600 proceeds to 630.

At 620, Network Module 245 transmits a signal to access media service on the Current Network. For example, when a Recommended Network is not found, the media service continues on the Current Network (or begins on the Selected Network if the media service being set up.) In some embodiments, Network Module 245 transmits a signal to streaming module 202 indicating that there are no changes to the Current Network or that media service will be accessed on the Selected Network.

At 630, Network Module 245 transmits a signal including a Recommended Network. For example, Network Module 245 transmits a signal to streaming module 202 indicating that the Recommended Network is an available network that may be used to access media service instead of the Current Network (or instead of the Selected Network.) See 415 of FIG. 4.

At 642, Network Module 245 determines whether a signal is received to switch to the Recommended Network. For example, Network Module 245 determines whether a signal is received from streaming module 202 to switch from the Current Network to the Recommended Network, or to utilize the Recommended Network instead of the Selected Network.

At 652, Network Module 245 transmits a signal to switch to the Recommended Network. For example, Network Module 245 can cause transceiver 220 to change from the Current Network (e.g., SSID 160*a*, wrt1100_2.4 GHz) to the Recommended Network (e.g., SSID 160*b*, wrt1100_5 GHz.) If media service is being set up, Network Module 245 can cause transceiver to utilize the Recommended Network (e.g., SSID 160*b*, wrt1100_5 GHz) for accessing media service.

Example Computer System

Figure 7:
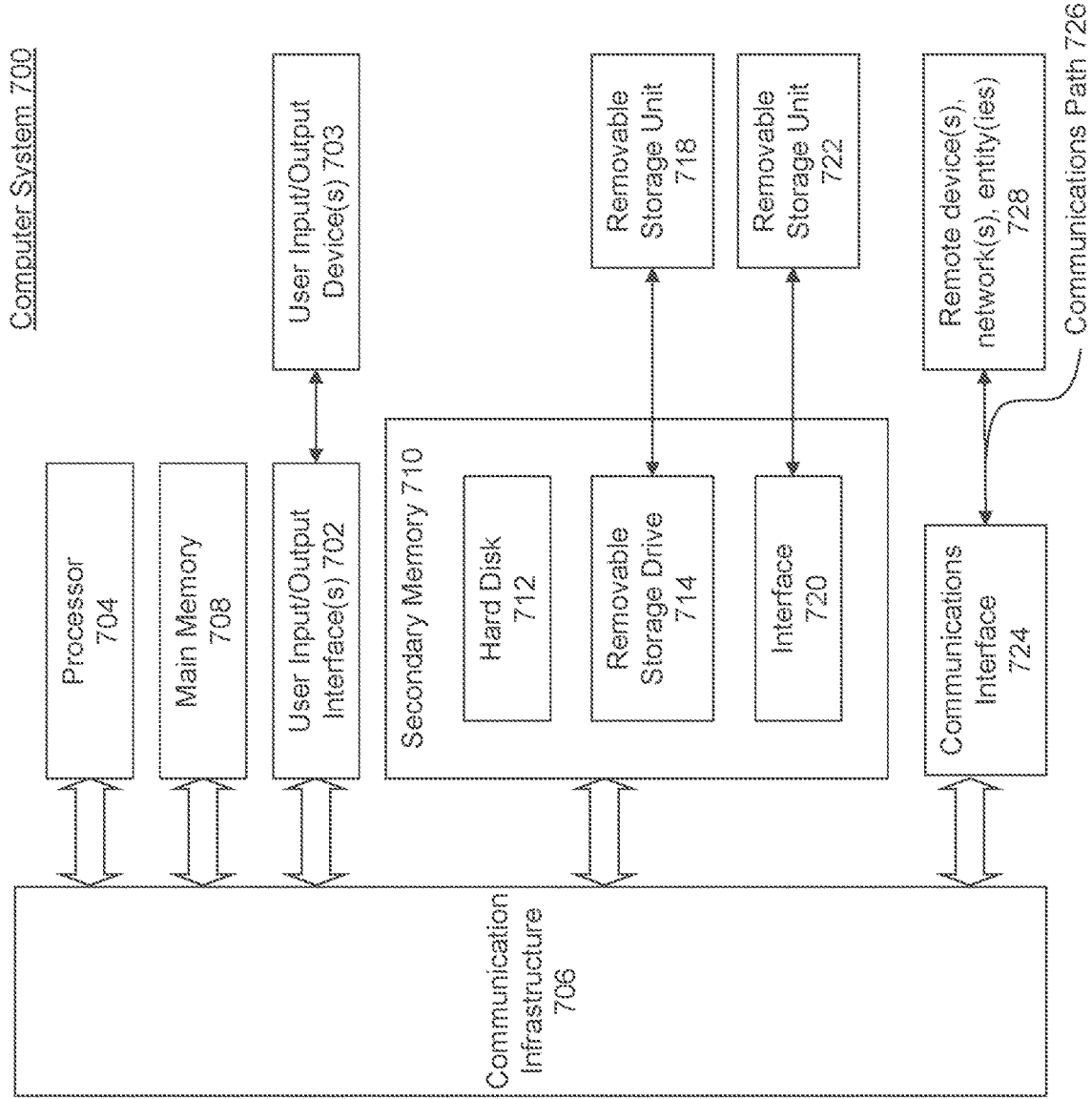
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure 706 or a bus.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for a media device, comprising:
   accessing a media service via a first wireless network of a plurality of wireless networks;
   streaming audio corresponding to the media service to a mobile device;
   determining a number of audio underrun events of the streaming audio that satisfies a configurable threshold value;
   subsequent to the determination, selecting a second wireless network of the plurality of wireless networks based on a comparison of data corresponding to one or more communication devices providing the plurality of wireless networks with platform capabilities of the media device comprising a plurality of antennas;
   determining that the second wireless network is available, wherein the second wireless network provides an improved user experience over the first wireless network;
   in response to the determining, establishing that a subset of characters of a first Service Set Identifier (SSID) of the first wireless network matches a second SSID of the second wireless network; and
   in response to the establishing, accessing the media service via the second wireless network using a first password of the first wireless network.

2. The computer implemented method of claim 1, further comprising:
   accessing the first password of the first wireless network; and
   transmitting the first password of the first wireless network to a communication device of the one or more communication devices providing the second wireless network.

3. The computer implemented method of claim 1, further comprising:
   determining that the utilization of the first password to access the second wireless network failed;
   subsequent to the failed determination, receiving input for a second password of the second wireless network; and
   transmitting the second password to a communication device providing the second wireless network.

4. The computer implemented method of claim 3, further comprising:
   determining that a record for the second password of the second wireless network does not exist;
   generating the record for the second password; and
   storing the record of the second password.

5. The computer implemented method of claim 1, wherein the platform capabilities comprise: a protocol type, a security level, a maximum bandwidth, a global positioning system (GPS) location, or a distance between the media device and a communication device of the one or more communication devices providing the second wireless network.

6. A system for a media device, comprising:
   a memory; and
   at least one processor coupled to the memory and configured to:
   access a media service via a first wireless network of a plurality of wireless networks;
   stream audio corresponding to the media service to a mobile device;
   determine a number of audio underrun events of the streaming audio that satisfies a configurable threshold value;
   subsequent to the determination, select a second wireless network of the plurality of wireless networks based on a comparison of data corresponding to one or more communication devices providing the plurality of wireless networks with platform capabilities of the system comprising a plurality of antennas;
   determine that the second wireless network is available, wherein the second wireless network provides an improved user experience over the first wireless network;
   in response to the determining, establish that a subset of characters of a first Service Set Identifier (SSID) of the first wireless network matches a second SSID of the second wireless network; and
   in response to the establishing, access the media service via the second wireless network using a first password of the first wireless network.

7. The system of claim 6, wherein the at least one processor is further configured to:
   access the first password of the first wireless network; and
   transmit the first password of the first wireless network to a communication device of the one or more communication devices providing the second wireless network.

8. The system of claim 6, wherein the at least one processor is further configured to:
- determine that the utilization of the first password to access the second wireless network failed;
- subsequent to the failed determination, receive input for a second password of the second wireless network; and
- transmit the second password to a communication device providing the second wireless network.

9. The system of claim 6, wherein the at least one processor is further configured to:
- subsequent to the determination, transmit a signal for presenting the second wireless network and choices; and
- subsequent to the transmission, receive input to switch from the first wireless network to the second wireless network.

10. The system of claim 6, wherein the platform capabilities comprise: a protocol type, a security level, a maximum bandwidth, a global positioning system (GPS) location, or a distance between the system and a communication device of the one or more communication devices providing the second wireless network.

11. A non-transitory computer-readable medium having instructions stored thereon that, when executed by at least one processor of a media device, cause the media device to perform operations comprising:
- accessing a media service via a first wireless network of a plurality of wireless networks;
- streaming audio corresponding to the media service to a mobile device;
- determining a number of audio underrun events of the streaming audio that satisfies a configurable threshold value;
- subsequent to the determination, selecting a second wireless network of the plurality of wireless networks based on a comparison of data corresponding to one or more communication devices providing the plurality of wireless networks with platform capabilities of the media device comprising a plurality of antennas;
- determining that the second wireless network is available, wherein the second wireless network provides an improved user experience over the first wireless network;
- in response to the determining, establishing that a subset of characters of a first Service Set Identifier (SSID) of the first wireless network matches a second SSID of the second wireless network; and
- in response to the establishing, accessing the media service via the second wireless network using a first password of the first wireless network.

12. The non-transitory computer-readable medium of claim 11, wherein the first wireless network and the second wireless network operate on different frequencies.

13. The non-transitory computer-readable medium of claim 11, wherein the platform capabilities further comprise a manufacturer type.

14. The non-transitory computer-readable medium of claim 11, wherein the platform capabilities further comprise a serial number.

15. The non-transitory computer-readable medium of claim 11, wherein the mobile device is a wireless remote control.

16. The non-transitory computer-readable medium of claim 11, wherein the configurable threshold value comprises 4 audio underrun events in a streaming audio session.

17. The non-transitory computer-readable medium of claim 11, wherein the operations further comprise:
- transmitting a video stream of the media service to a display device;
- determining a video bitrate of the video stream satisfies a second threshold value; and
- based on the video bitrate satisfying the second threshold value, selecting a third wireless network of the plurality of wireless networks.

18. The non-transitory computer-readable medium of claim 17, wherein to satisfy the second threshold value, the video bitrate drops below 3 megabits per second (Mbps).

19. The non-transitory computer-readable medium of claim 11, wherein the operations further comprise:
- transmitting a video stream of the media service to a display device;
- determining a video start time of the video stream satisfies a second threshold value; and
- based on the video start time satisfying the second threshold value, selecting a third wireless network of the plurality of wireless networks.

20. The non-transitory computer-readable medium of claim 19, wherein to satisfy the second threshold value, the video start time exceeds 5 seconds.

* * * * *